United States Patent
Wills

(10) Patent No.: US 8,616,372 B2
(45) Date of Patent: Dec. 31, 2013

(54) RECYCLABLE BLISTER PACK AND PROCESS OF MAKING

(75) Inventor: Kenneth Raymond Wills, Slinger, WI (US)

(73) Assignee: Quality Packaging, Inc., Fond du Lac, WI (US)

( * ) Notice: Subject to any disclaimer, the term of this patent is extended or adjusted under 35 U.S.C. 154(b) by 345 days.

(21) Appl. No.: 12/252,839

(22) Filed: Oct. 16, 2008

(65) Prior Publication Data

US 2009/0101534 A1    Apr. 23, 2009
US 2012/0325712 A2    Dec. 27, 2012

Related U.S. Application Data

(60) Provisional application No. 60/999,329, filed on Oct. 17, 2007.

(51) Int. Cl.
     *B65D 73/00*      (2006.01)

(52) U.S. Cl.
     USPC ............................ 206/462; 206/470; 206/463

(58) Field of Classification Search
     USPC ......... 206/462, 461, 703, 704, 705, 463, 470, 206/471; 156/227
     See application file for complete search history.

(56) References Cited

U.S. PATENT DOCUMENTS

| | | | |
|---|---|---|---|
| 4,359,158 A | 11/1982 | Gringer | |
| 4,408,693 A | 10/1983 | Brewaeys et al. | |
| 4,469,226 A | 9/1984 | Matney | |
| 4,599,265 A * | 7/1986 | Esmay | 428/355 RA |
| 4,779,734 A | 10/1988 | Kydonieus | |
| 4,842,141 A * | 6/1989 | Segal | 206/462 |
| 4,848,577 A | 7/1989 | Hoffman et al. | |
| 4,850,488 A | 7/1989 | Humbert | |
| 4,860,890 A * | 8/1989 | Cerny et al. | 206/704 |
| RE33,191 E | 4/1990 | Matney | |
| 5,014,851 A * | 5/1991 | Wick | 206/539 |
| 5,033,616 A | 7/1991 | Wyser | |
| 5,067,611 A | 11/1991 | Hagmann et al. | |
| 5,297,679 A * | 3/1994 | Rondone et al. | 206/468 |
| 5,307,934 A | 5/1994 | Hagner | |
| 5,356,010 A | 10/1994 | Weinstein | |
| 5,360,116 A | 11/1994 | Schmiletzky | |
| 5,413,384 A * | 5/1995 | Principe et al. | 283/81 |
| 5,624,036 A | 4/1997 | Roulin et al. | |
| 5,803,248 A | 9/1998 | Cox | |
| 5,840,243 A | 11/1998 | Hicks et al. | |
| 5,853,101 A | 12/1998 | Weinstein | |
| 5,908,111 A | 6/1999 | Purdy | |
| 6,053,321 A | 4/2000 | Kayser | |
| 6,155,414 A | 12/2000 | Vaessen | |
| 6,234,781 B1 | 5/2001 | Hicks et al. | |
| 6,279,746 B1 | 8/2001 | Hussaini et al. | |

(Continued)

OTHER PUBLICATIONS

U.S. Appl. No. 13/529,801, filed Jun. 21, 2012, Wills.

*Primary Examiner* — Steven A. Reynolds
(74) *Attorney, Agent, or Firm* — Reinhart Boerner Van Deuren s.c.

(57) ABSTRACT

A recyclable blister pack system is provided, including a substrate having a dry tack cohesive adhesive layer deposited on one of its surfaces and a blister layer for receiving a product. The properties of the dry tack cohesive are selected so the blister layer is separable from the substrate without leaving substantial substrate residue on the blister layer. This improves the recyclability of the blister layer.

20 Claims, 2 Drawing Sheets

(56) References Cited

U.S. PATENT DOCUMENTS

| | | |
|---|---|---|
| 6,308,832 B1 * | 10/2001 | Pirro et al. ............... 206/469 |
| 6,345,717 B1 | 2/2002 | Flewitt |
| 6,436,499 B1 | 8/2002 | Krampe et al. |
| 6,938,770 B2 | 9/2005 | Nittono et al. |
| 6,957,909 B1 | 10/2005 | Dingeldein et al. |
| 7,726,480 B2 | 6/2010 | Nazari |
| 8,205,746 B2 | 6/2012 | Nazari |
| 8,205,747 B2 | 6/2012 | Nazari |
| 2004/0159571 A1 * | 8/2004 | Fagen et al. ............... 206/461 |
| 2005/0181205 A1 * | 8/2005 | Story ............... 428/356 |
| 2005/0196630 A1 * | 9/2005 | Carper et al. ............... 428/500 |
| 2006/0028014 A1 * | 2/2006 | McQueeny et al. ............... 283/101 |
| 2006/0231446 A1 * | 10/2006 | Venis ............... 206/460 |
| 2007/0125678 A1 * | 6/2007 | Green ............... 206/461 |
| 2007/0187264 A1 * | 8/2007 | Hofte et al. ............... 206/45.24 |
| 2007/0187273 A1 * | 8/2007 | Grosskopf ............... 206/462 |
| 2007/0209957 A1 * | 9/2007 | Glenn et al. ............... 206/462 |

* cited by examiner

RECYCLABLE BLISTER PACK AND PROCESS OF MAKING

REFERENCE TO PRIOR APPLICATION

The present application claims the benefit of U.S. provisional application, Ser. No. 60/999,329, filed Oct. 17, 2007.

FIELD OF THE INVENTION

The present invention relates to an easily recyclable blister pack system and to the process of making.

DESCRIPTION OF THE RELATED ART

Consumer packaging has evolved from simple cartons that protected the product, but which required opening the carton to view the contents, to blister/card packages that encapsulate the product while still allowing viewing the product, to thermoformed clamshell containers that allow tamper-proof viewing of the finished product. Each step in the evolution of the packaging has increased the cost of the package, the amount of hydrocarbons required for manufacture, and reduced the opportunity for recycling the packaging materials following removal of the product.

In the case of card/blister packages, the product is inserted into a thermoplastic blister that is then heat-sealed (at elevated temperature and pressure) to a printed chipboard card that has been coated with a heat-sensitive adhesive. When the product is removed from the package, the adhesive and fibers bond to the blister, and prevent efficient re-cycling of the blister material. In addition, the card/blister packages are subject to size and weight limitations because the assembled package must fit into heat-sealing machines.

In the case of clamshell packages, the product is inserted into a transparent thermoplastic shell that fully encloses it. The shell consists of two halves joined by a hinge made of the material found in the shell. The clamshell is folded in half to form an enclosure that completely encloses the packaged product. The two halves of the assembled clamshell can be held together by a friction-fit between the assembled halves, or by means of a mechanical fastener such as a staple. For heavy or high value products, the shell may be heat or radio frequency (RF) sealed for tamper resistance, but the heat-sealing operation frequently causes customer dissatisfaction due to the extreme difficulty in opening the pack to use the product. In addition, the clamshell package uses two to three times the hydrocarbons required for a card/blister package. The clamshell materials are not easily separable for recycling.

Consumers are increasingly concerned with the excessive amounts of plastic, cardboard and paper associated with the packaging of consumer products, as are various environmental conservation groups. Some major consumer product retailers have also expressed dissatisfaction with currently available consumer product packaging options, especially those with a high impact to the environment.

One such national retailer has developed a "sustainability scorecard" that measures the environmental impact of the packaging used for consumer products. The sustainability scorecard is used to reward suppliers that have developed or utilized sustainable packaging products and technology. Suppliers that do not utilize sustainable packaging will be at a competitive disadvantage.

By way of example, the sustainability scorecard includes the following factors that are considered: greenhouse gasses (e.g., carbon dioxide ($CO_2$) created per ton of packaging production, material value, product-to-package ratio, cube utilization, cost of transportation, total recycled content, recovery value, renewable energy use in production, and innovativeness.

Accordingly, there is a recognized need for new packaging products and packaging manufacturing techniques that minimize impact to the environment throughout the entire life cycle of the product from manufacture through sale, use, and ultimate disposal.

It is an object of the invention to provide a packaging system that meets the sustainability scorecard targets and offers significantly improved recyclability.

SUMMARY OF THE INVENTION

The present invention provides an easily and efficiently recyclable packaging system for consumer products capable of incorporating full color graphics, tamper and theft resistance, use of recycled materials (RPET blister and post-consumer corrugate), and a dry tack cohesive adhesive. The packaging consists of three components: a die-cut substrate (a corrugate body in the preferred embodiment), a thermoformed RPET blister layer, and a dry tack cohesive adhesive.

In its simplest form, the invention comprises a substrate having first and second regions, a dry tack cohesive layer applied to the first and second regions, and a blister layer for accepting a product and having a surface along its periphery capable in use of capture between the dry tack cohesive layers The adhesive properties of the cohesive layer are selected such that it is capable of forming a seal only with itself and the substrate, and so it is separable from the blister layer without leaving substrate residue to facilitate recyclability.

In the preferred embodiment, the invention comprises a blister pack system including a substrate having first and second regions with at least one of the regions having an opening formed therein for receiving a product, a dry tack cohesive layer applied to the first and second regions, and a blister layer shaped to accept a product and having a surface along its periphery capable in use of capture between the dry tack adhesive layer on the first and second regions. The adhesive properties of the cohesive layer are selected such that it is capable of forming a seal only with itself and the substrate, and so that it is separable from the blister layer without leaving substrate residue to facilitate recyclability.

The process for assembling the blister pack system includes the steps of forming a dry tack cohesive layer above a substrate having first and second regions, with one of the regions having an opening formed therein, the substrate is folded along a line dividing the first and second regions and the blister layer positioned between the first and second regions of the substrate so the shaped portion of the blister layer accepts a product and passes through the opening formed in the substrate, and so that its peripheral surface is between the first and second regions having the dry tack cohesive layer formed thereon. The system is sealed by applying pressure to the substrate along the peripheral surface of the first and second regions. The cohesive adhesive adheres to itself thereby holding the blister layer securely in place. The adhesive properties of the cohesive layer are selected such that it is capable of forming a seal only with itself and the substrate, and so it is separable from the blister layer without leaving substrate residue to facilitate recyclability.

DETAILED DESCRIPTION OF THE INVENTION

Figure 1:
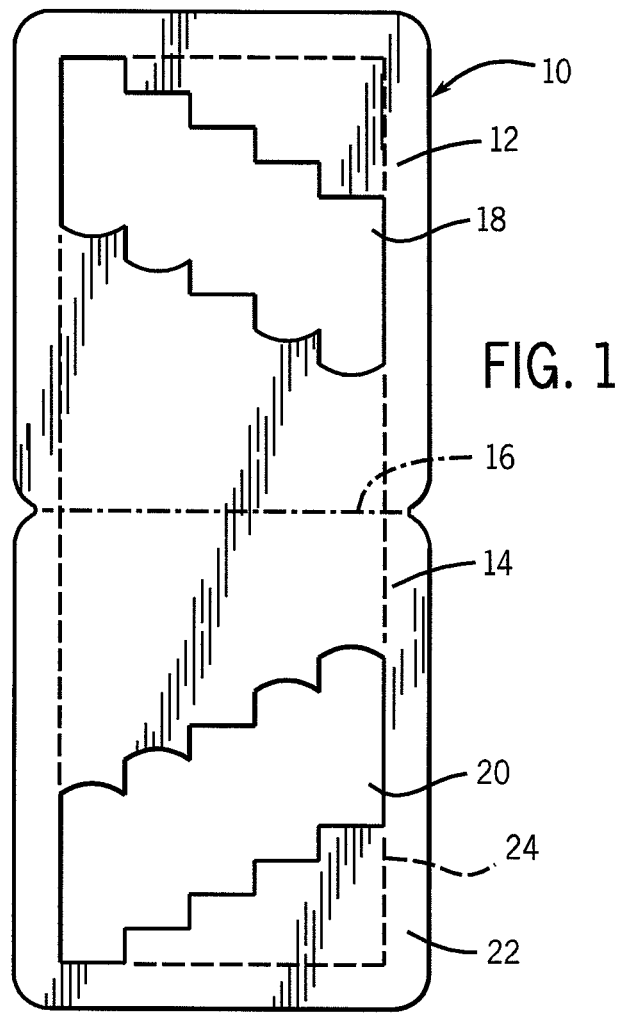
FIG. 1 is a top view of the die-cut substrate or corrugate body.

FIG. 1 shows a planar substrate 10, which in the preferred embodiment is corrugate body having a generally rectangular shape, but which can also be a chipboard material. Although not shown in FIG. 1, substrate 10 may be pre-printed with a color graphic label describing the product (also not shown). The substrate is generally divided into two halves or regions 12 and 14 separated by a centerline 16 which, to facilitate folding of the substrate, may be formed by scoring or perforation. A pair of die-cut openings 18 and 20 are formed, respectively, in regions 12 and 14 of the substrate. While two openings 18 and 20 are shown in FIG. 1, not all packaging applications require both openings. The die-cut openings generally approximate the outline of the product being packaged. Substrate 10 is sized to allow approximately a one inch sealing area 22 along the perimeter of the substrate and surrounding the die cut openings, as suggested by dotted line 24. The width and shape of sealing area 22 can be varied to suit the size and weight of the product to be packaged. Larger, heavier products typically require a wider sealing area to ensure integrity of the package.

Figure 2:
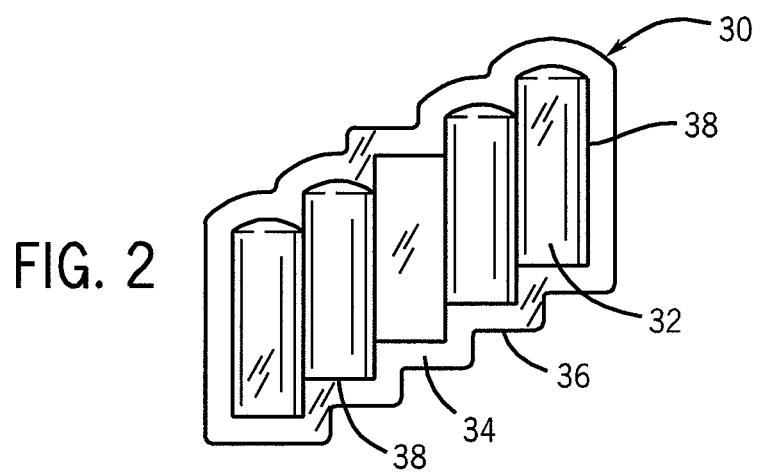
FIG. 2 depicts the thermoformed RPET blister layer.

The thermoformed blister layer 30, shown in FIG. 2, is produced preferably from recycled polyethylene terephthalate (RPET) resin with a nominal thickness of 10-15 mils (0.010-0.015 in.). The blister layer is produced in a well known manner by placing RPET film into a forming die (not shown) under heat and pressure. In the preferred embodiment, the die closely approximates the shape of the product or products to be packaged and forms regions or volumes 32 for receiving the product. The blister layer design incorporates a flange 34 disposed generally between perimeter 36 of the blister layer and edges 38 of regions 32. In the preferred embodiment, flange 34 is approximately 0.38 in. wide. The flange serves to contain the blister layer and product(s) within the substrate lamination formed when the corrugate body is folded along line 16 (FIG. 1) and sealed as described hereinafter. In those instances when it is desirable that the packaged product be viewable from both sides, a second blister layer (a mirror image of the first) needs to be formed. One blister layer is installed into substrate openings 18 and 20 (FIG. 1).

The unique properties of the dry tack adhesive are a critical element of the package. The adhesive is a formulated latex rubber product that is applied in aqueous (water-based) liquid form, but which dries as a dry tack adhesive (also referred to as a cohesive) which adheres to itself and the substrate, but not to most other surfaces such as the blister layer. This selective adherence property enables the blister layer to be removed or separated for recycling without adhesive residue or fibrous residue material from the substrate, especially a corrugate substrate, remaining on it. This facilitates efficient recycling of the RPET material. The adhesive properties are carefully controlled to create an environmentally acceptable adhesive with unique cohesive properties that also enable handling and transportation of the coated, unsealed substrates without blocking (i.e., the sticking of substrates to one another).

In the preferred embodiment, the physical properties of the adhesive are: aqueous solution; solids 66% by weight viscosity (dry aged) of approximately 4000 CPS (Centipoise) in 3 months; rheology—highly pseudo-plastic and thixotropic, with a ratio of viscosity at one RPM (revolution per minute) to viscosity at 50 RPM of approximately 14:1; pH—alkaline approximately 10.5 ammonical; viscosity (liquid form)—1330 CPS. The viscosity is controlled at application by thinning with water.

Figure 3:
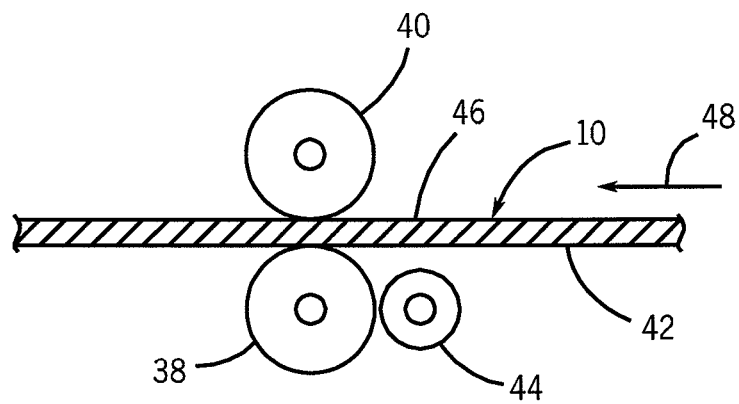
FIG. 3 is a schematic representation of the bottom single roll coating process.

The adhesive is applied to the substrate using a conventional roll coating machine. In the preferred embodiment, the single bottom roller coating process is utilized. FIG. 3 shows a typical arrangement. Substrate 10 is positioned for linear movement between rollers 38 and 40. Adhesive is dispensed onto unprinted substrate surface 42 and is spread uniformly by roller 38, as the substrate advances in the direction indicated by arrow 48. The single bottom roll coating process is used to ensure a uniform coating on the unprinted side 42 of the substrate. Care must be taken to prevent transfer of the cohesive to the printed (finished) side 46 of the substrate. Once the substrate has been coated, it is air-dried or heat-dried to produce a tack-free surface. Finished adhesive-coated substrates should be stored in a dry, temperature controlled area maintained at between 40-100 degrees Fahrenheit, and protected from dust and light, especially ultraviolet (UV) light.

Figure 4:
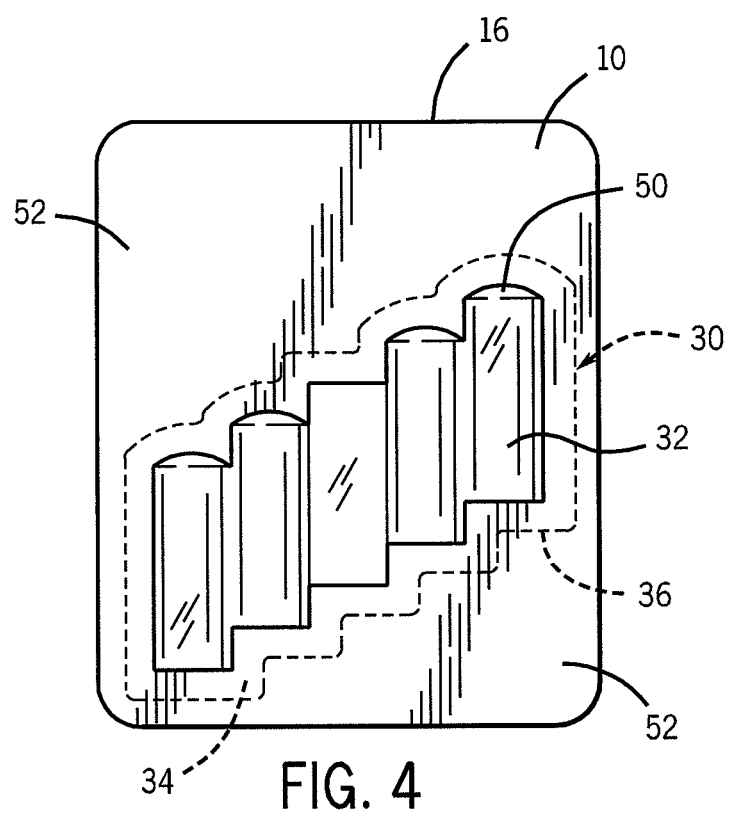
FIG. 4 shows an assembled blister pack system with the products installed in the blister layer, and the blister layer installed in the corrugate body.

Actual packaging of products using the blister pack system is relatively straight forward and typically occurs at a location different from where the substrate coating and blister layer operations occurred. Referring now to FIGS. 1-4, the products 50 to be packaged and blister layers 30 (assuming the products are to be viewed from both sides) are placed into die-cut openings 18 and 20 of the substrate, and the substrate folded along line 16. Substrate body 10 is folded so that the cohesive-coated surfaces 42 on each substrate region 12 and 14 are brought together in sealing area 52 (FIG. 4) lying generally outside blister layer perimeter 36 and the outside edges of the substrate 10 and hold flange 34 there-between. Once the substrate has been folded to contain the blister layers and products, area 52 must be pressure-sealed to ensure a complete bond between the two substrate surfaces along area 52 to firmly hold flange 34 of the blister layer in place. Adequate pressure is required to develop the bond. This pressure can be produced by the use of a manual or mechanical weighted roller, or other mechanical means (including commercially available card/blister sealing machines), as long as the resulting pressure is sufficient to bond the cohesive, thereby producing a finished laminated package which contains the products and blisters between the substrate, as shown in FIG. 4.

It will be appreciated that utilization of perimeter sealing of the substrate, as disclosed, results in a tamper-resistant package and enables packaging of heavy products.

The invention has been disclosed with reference to its preferred embodiment. It will be recognized, however, that variations are possible. For example, different types of substrate materials such as corrugate or chipboard may be used. Similarly, substrates of different thicknesses may be used based upon the size and weight of the product to be packaged. Different printing techniques may also be used to create the graphics on the substrate. Different adhesive formulations may be used instead of the specific cohesive formulation disclosed herein, but the selective adherence properties and ability to handle and ship coated substrates prior to assembly is a critical element of the package.

The invention claimed is:

1. A tamper-resistant, multi-piece package comprising:
   a planar, fibrous substrate comprising:
      an unprinted side;
      a printed side opposite the unprinted side;
      a centerline configured to facilitate folding, dividing the fibrous substrate into a first region and a second region; and
      a first opening passing through the second region;
   a dry-tack coadhesive layer having first and second opposing portions located on opposing unprinted sides of both the first and second regions, respectively, wherein the dry-tack coadhesive is an aqueous material that is configured to dry as a coadhesive after application to the substrate; and
   a blister layer configured to accept a product, wherein the blister layer includes a peripheral section;
   wherein the first and second opposing portions of the dry-tack coadhesive layer are brought together by folding the substrate along the centerline sealing the opposing portions of the dry-tack coadhesive layer to each other;
   wherein the peripheral section of the blister layer is captured between the opposing portions of the dry-tack coadhesive layer without the dry-tack coadhesive adhering to the blister layer.

2. The package of claim 1 wherein the dry-tack coadhesive of the dry-tack coadhesive layer comprises a latex rubber coadhesive capable of adhesion by pressure produced by manual force without heating.

3. The package of claim 1 wherein the dry-tack coadhesive layer is a uniform layer of dry-tack coadhesive.

4. The package of claim 1 wherein the first and second opposing portions of the dry-tack coadhesive layer each include bands of dry-tack adhesive located adjacent to the left and right peripheral edges of the substrate positioned substantially perpendicular to the centerline, wherein the peripheral section of the blister layer is captured between the opposing bands of dry-tack adhesive.

5. The package of claim 4 wherein bands of dry-tack adhesive have a width of approximately one inch.

6. The package of claim 1 wherein the blister layer is made of recycled polyethylene terephthalate.

7. The package of claim 1 wherein the substrate is made from a corrugated material.

8. The package of claim 1 wherein the substrate is made from a chipboard material.

9. The package of claim 1 wherein the printed side of the substrate includes a color graphic label.

10. The package of claim 1 wherein the substrate is substantially rectangular, and the centerline is positioned to divide the substrate into equally sized first and second regions, and further wherein the opposing first and second portions of the dry-tack coadhesive layer are symmetrical about the centerline.

11. The package of claim 10 wherein the first region includes a second opening passing through the first region, the second opening positioned such that the first opening and the second opening align with each other following folding.

12. The package of claim 11, wherein the centerline is at least one of a score or perforation configured to facilitate folding.

13. A package comprising:
   a fibrous substrate comprising:
      an unprinted side;
      a printed side opposite the unprinted side;
      a hinge configured to facilitate folding, dividing the fibrous substrate into a first region and a second region; and
      an opening passing through the second region;
      wherein the material of the fibrous substrate is at least one of a corrugated material or a chipboard material;
   a dry-tack coadhesive layer having first and second opposing portions deposited on opposing unprinted sides of both the first and second regions of the fibrous substrate, respectively, wherein the dry-tack coadhesive is an aqueous material that is configured to dry as a coadhesive after application to the substrate, wherein the dry-tack coadhesive layer is a uniform layer on the unprinted surface of the substrate; and
   a blister layer configured to accept a product, wherein the blister layer includes a peripheral section;
   wherein the first and second opposing portions of the dry-tack coadhesive layer are positioned such that folding the substrate along the hinge brings the opposing portions of the dry-tack coadhesive layer into contact with each other to form a bond;
   wherein the peripheral section of the blister layer is captured between the opposing portions of the dry-tack coadhesive layer.

14. The package of claim 13 wherein the dry-tack coadhesive of the dry-tack coadhesive layer is a latex rubber coadhesive capable of adhesion by pressure produced by manual force without heating.

15. The package of claim 13 wherein the dry-tack coadhesive of the dry-tack coadhesive layer is only bonded to itself and the unprinted side of the substrate and does not bond to the material of the peripheral section of the blister layer once dried.

16. The package of claim 13 wherein the aqueous coadhesive is not applied to the blister layer.

17. The package of claim 13 wherein the blister layer is made of recycled polyethylene terephthalate.

18. The package of claim 13, wherein the printed side of the substrate includes a color graphic label.

19. The package of claim 13 wherein the substrate is substantially rectangular, and the hinge is positioned to divide the substrate into equally sized first and second regions, wherein the hinge is at least one of a score or perforation configured to facilitate folding.

20. The package of claim 19, wherein the first region includes a second opening passing through the first region, the second opening positioned such that the first opening and the second opening align with each other following folding, and further wherein the opposing first and second portions of the dry-tack coadhesive layer are symmetrical about the hinge.

* * * * *